US009426155B2

(12) United States Patent
Chao et al.

(10) Patent No.: US 9,426,155 B2
(45) Date of Patent: Aug. 23, 2016

(54) EXTENDING INFRASTRUCTURE SECURITY TO SERVICES IN A CLOUD COMPUTING ENVIRONMENT

(71) Applicant: International Business Machines Corporation, Armonk, NY (US)

(72) Inventors: Ching-Yun Chao, Austin, TX (US); John Yow-Chun Chang, Austin, TX (US); Paul W. Bennett, Austin, TX (US); John C. Sanchez, Pflugerville, TX (US); Donald R. Woods, Raleigh, NC (US); Yuhsuke Kaneyasu, Tokyo (JP); Sriram Srinivasan, Sunnyvale, CA (US); Stuart Robert Douglas Monteith, Winchester (GB); Marcos Lohmann, Limeira (BR)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/865,692

(22) Filed: Apr. 18, 2013

(65) Prior Publication Data
US 2014/0317716 A1    Oct. 23, 2014

(51) Int. Cl.
 G06F 7/04     (2006.01)
 H04L 29/06    (2006.01)

(52) U.S. Cl.
 CPC ........... *H04L 63/10* (2013.01); *H04L 63/0815* (2013.01)

(58) Field of Classification Search
 CPC ........... H04L 63/0807; H04L 63/0815; H04L 63/0823; H04L 63/0884; H04L 63/083; H04L 63/08; H04L 63/0853; G06F 21/31; G06F 21/335; G06F 21/41; G06F 21/30; G06F 21/34; G07F 7/1008

USPC ................................... 726/7–9; 713/168–172
 See application file for complete search history.

(56) References Cited

U.S. PATENT DOCUMENTS

| 2005/0223413 | A1* | 10/2005 | Duggan et al. ................. 726/3 |
| 2010/0211781 | A1 | 8/2010 | Auradkar et al. |
| 2010/0217850 | A1 | 8/2010 | Ferris |
| 2011/0022812 | A1 | 1/2011 | van der Linden et al. |

(Continued)

OTHER PUBLICATIONS

Mondol, "Cloud security solutions using FPGA," IEEE, Jun. 15, 2011.
IBM, "Method of creating a componentized architecture for unifying resource sharing scenarios in Cloud Computing environment," IPCOM000193146D, Feb. 11, 2010.

(Continued)

*Primary Examiner* — Ali Abyaneh
(74) *Attorney, Agent, or Firm* — Richard A. Wilhelm; David H. Judson

(57) ABSTRACT

A cloud deployment appliance (or other platform-as-a-service (IPAS) infrastructure software) includes a mechanism to deploy a product as a "shared service" to the cloud, as well as to enable the product to establish a trust relationship between itself and the appliance or IPAS. The mechanism further enables multiple products deployed to the cloud to form trust relationships with each other (despite the fact that each deployment and each product typically, by the nature of the cloud deployment, are intended to be isolated from one another). In addition, once deployed and provisioned into the cloud, a shared service can become part of a single sign-on (SSO) domain automatically. SSO is facilitated using a token-based exchange. Once a product registers with a token service, it can participate in SSO. This approach enables enforcement of consistent access control policy across product boundaries, and without requiring a user to perform any configuration.

21 Claims, 7 Drawing Sheets

(56) References Cited

U.S. PATENT DOCUMENTS

| | | |
|---|---|---|
| 2011/0258692 A1 | 10/2011 | Morrison et al. |
| 2011/0302415 A1 | 12/2011 | Ahmad et al. |
| 2012/0072985 A1 | 3/2012 | Davne et al. |
| 2012/0096271 A1* | 4/2012 | Ramarathinam et al. .... 713/172 |
| 2012/0291114 A1* | 11/2012 | Poliashenko et al. ............ 726/8 |
| 2013/0007845 A1 | 1/2013 | Chang et al. |
| 2013/0086670 A1* | 4/2013 | Vangpat et al. .................. 726/8 |
| 2013/0191884 A1* | 7/2013 | Leicher et al. ................... 726/4 |
| 2013/0254847 A1 | 9/2013 | Adams et al. |
| 2013/0332515 A1 | 12/2013 | Jiminez et al. |
| 2013/0332982 A1* | 12/2013 | Rao et al. ......................... 726/1 |

OTHER PUBLICATIONS

Anonymous, "Advanced Cloud—Cloud Instance Open Authentication (OAuth) Security Mechanism," IPCOM000205927D, Apr. 8, 2011.

Buecker et al, "Cloud Security Guidance, IBM Recommendations for the Implementation of Cloud Security" 2009.

Wu et al, "Information Flow Control in Cloud Computing," Proceedings 2010 6th International Conference on Collaborative Computing: Networking, Applications and Worksharing, 2010.

Written Opinion and International Search Report, PCT/CA2014/050176, Aug. 13, 2014.

* cited by examiner

EXTENDING INFRASTRUCTURE SECURITY TO SERVICES IN A CLOUD COMPUTING ENVIRONMENT

BACKGROUND OF THE INVENTION

1. Technical Field

This disclosure relates generally to establishing a trusted computing environment across distinct security domains in the context of a "cloud" compute environment.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide an appliance-based solution to facilitate rapid adoption and deployment of cloud-based offerings. One such appliance is IBM® Workload Deployer, which is based on the IBM DATAPOWER® 7199/9005 product family. Typically, the appliance is positioned directly between the business workloads that many organizations use and the underlying cloud infrastructure and platform components. Because of this unique position, the appliance can receive and act upon operational data, and it can monitor application workload demand conditions and adjust resource allocation or prioritization as required to achieve established service level agreements. IBM Workload Deployer (IWD) also may be used to manage a shared, multi-tenant environment, where isolation and security are important.

IBM Workload Deployer and, more generally, platform-as-a-service (PAS) infrastructure software (IPAS), can be extended by installing additional services for the cloud computing environment. Some examples include, for example, caching services to add a data caching capability to virtual applications, monitoring services to monitor health and performance status of virtual applications, and the like. Often, the new service is provided by a commercial product that has its own built-in security mechanisms including, for example, user management, authentication and access control. While it can be quite advantageous to add such services, there is no simple way to integrate such products with the cloud computing infrastructure to provide users seamless security integration with single sign-on (SSO) behavior, and consistent and unified access control policy. This is because, typically, these additional services are installed in a manner similar to any new deployment, meaning that they are installed into their own separate security domain (for isolation).

To illustrate the problem, it is well-known that different monitoring products frequently are used to monitor different parts and aspects of a system's resources. Thus, for example, there are monitor products that monitor health status and performance of physical resources, such as the virtual machine, CPU, memory and disk storage usage; other monitoring tools monitor database health, utilization and throughput performance. When installing such disparate products in an IBM Workload Deployer (or IPAS) environment, an administrator may receive a general warning that, say, a virtual machine is not functioning properly. To view the general status in more detail, the administrator then clicks on a resource link to one monitoring product but, by doing so, but then he or she discovers that the problem is caused by a database subsystem being monitored by another product. In this process, the administrator moves from one monitoring product to a different one, which involves traversing through different trust domains and different resource representations. This requirement greatly complicates the deployment and management operations.

Currently, there is no easy way to link multiple products together, to integrate them with the cloud computing infrastructure, and to present an integral management system.

This disclosure addresses this problem.

BRIEF SUMMARY

According to this disclosure, a cloud deployment appliance (or other platform-as-a-service (IPAS) infrastructure software) includes a mechanism to deploy a product as a "shared service" to the cloud, as well as to enable the product to establish a trust relationship between itself and the appliance or IPAS. The mechanism further enables multiple products deployed to the cloud to form trust relationships with each other (despite the fact that each deployment and each product typically, by the nature of the cloud deployment, are intended to be isolated from one another). In addition, once deployed and provisioned into the cloud, a shared service can become part of a single sign-on (SSO) domain automatically. SSO is facilitated using a token-based exchange. Once a product registers with a token service, it can participate in SSO. This approach enables enforcement of consistent access control policy across product boundaries, and without requiring a user to perform any configuration.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
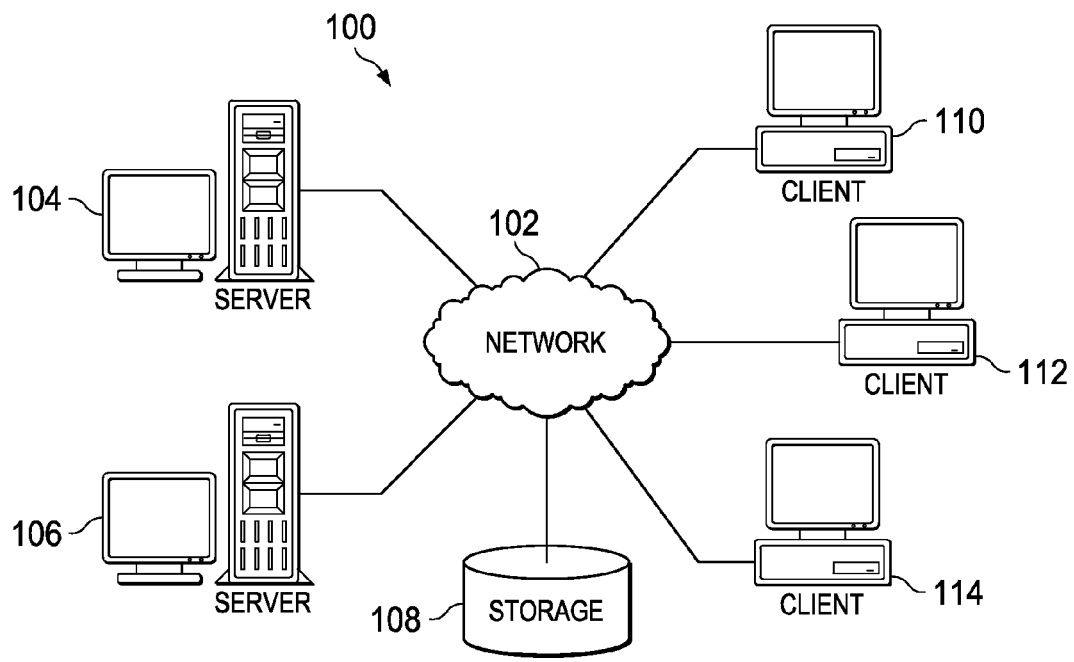
FIG. 1 depicts an exemplary block diagram of a distributed data processing environment in which exemplary aspects of the illustrative embodiments may be implemented.
Figure 2:
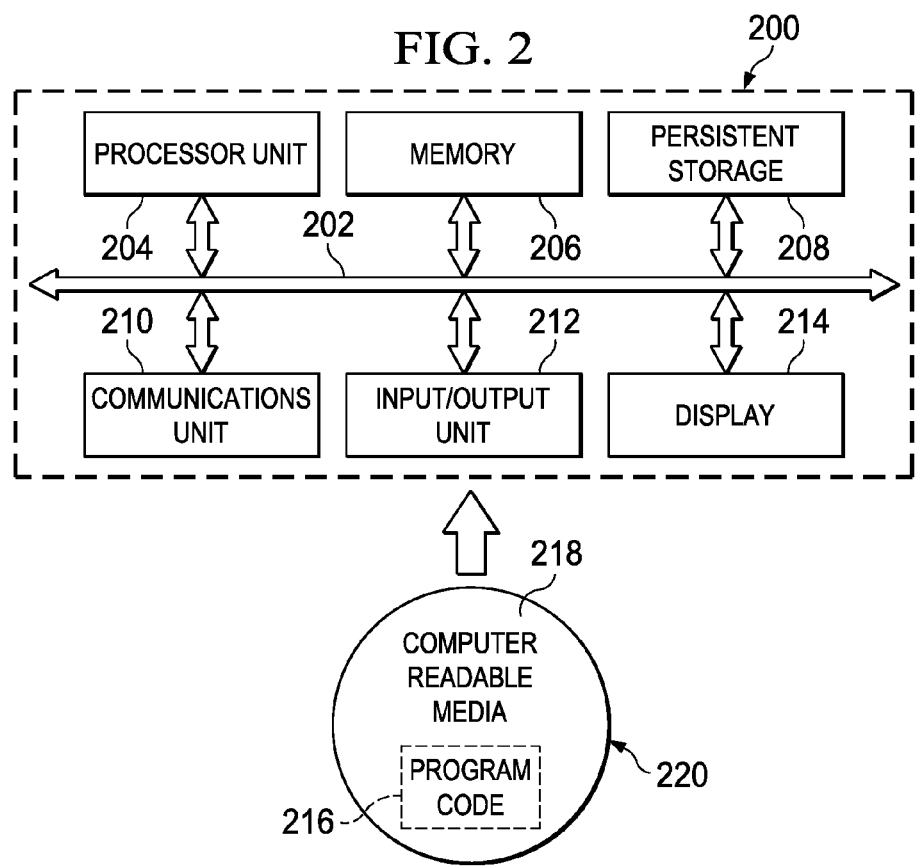
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
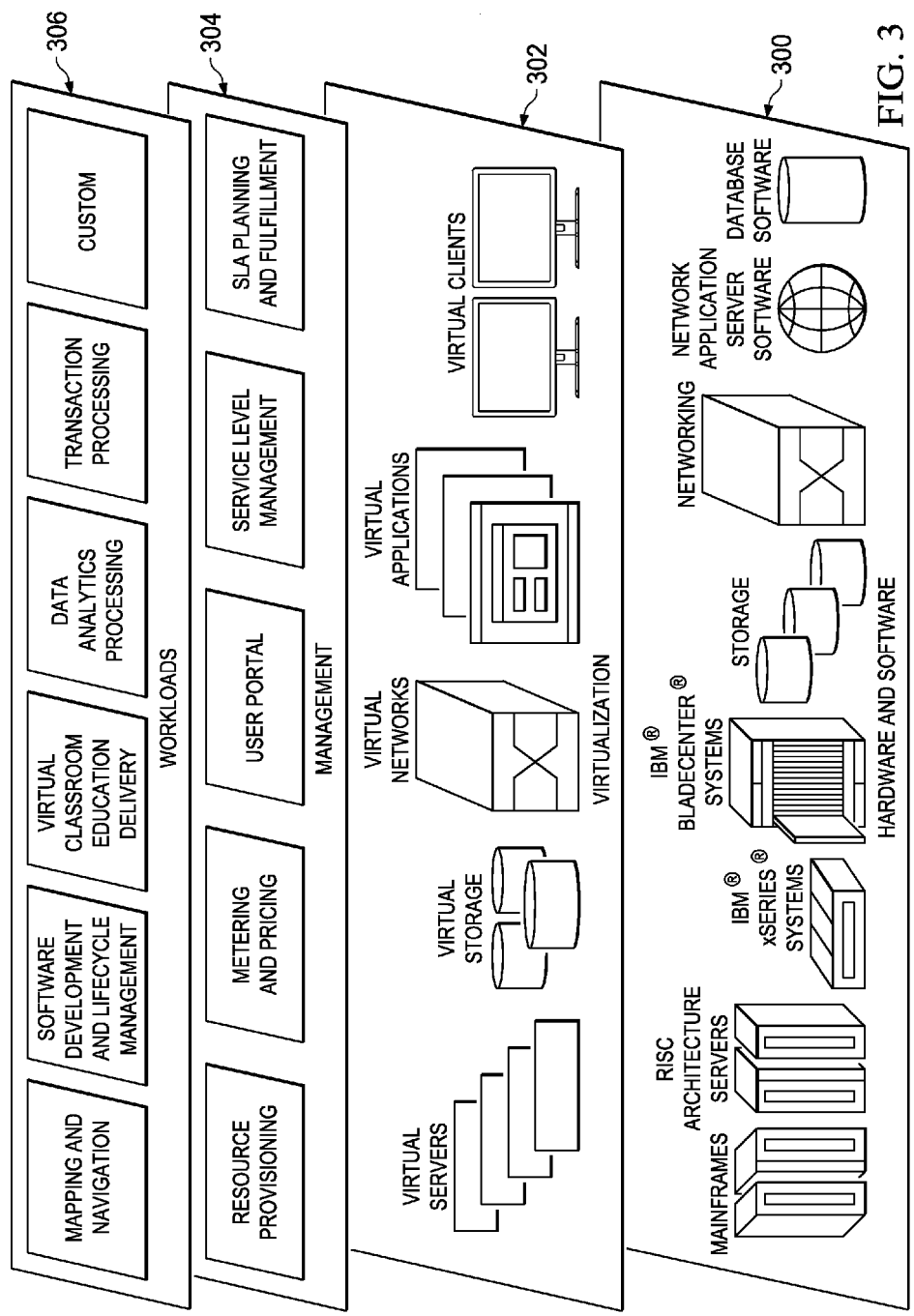
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® ZSERIES® systems; RISC (Reduced Instruction Set Computer) architecture based servers, in one example IBM PSERIES® systems; IBM XSERIES® systems; IBM BLADECENTER® systems; storage devices; networks and networking components. Examples of software components include network application server software, in one example IBM WEBSPHERE® application server software; and database software, in one example IBM DB2® database software.

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Cloud Deployment Technologies

It is known to provide an appliance-based solution to facilitate rapid adoption and deployment of both Infrastructure and Platform as Service offerings. As described above, one such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
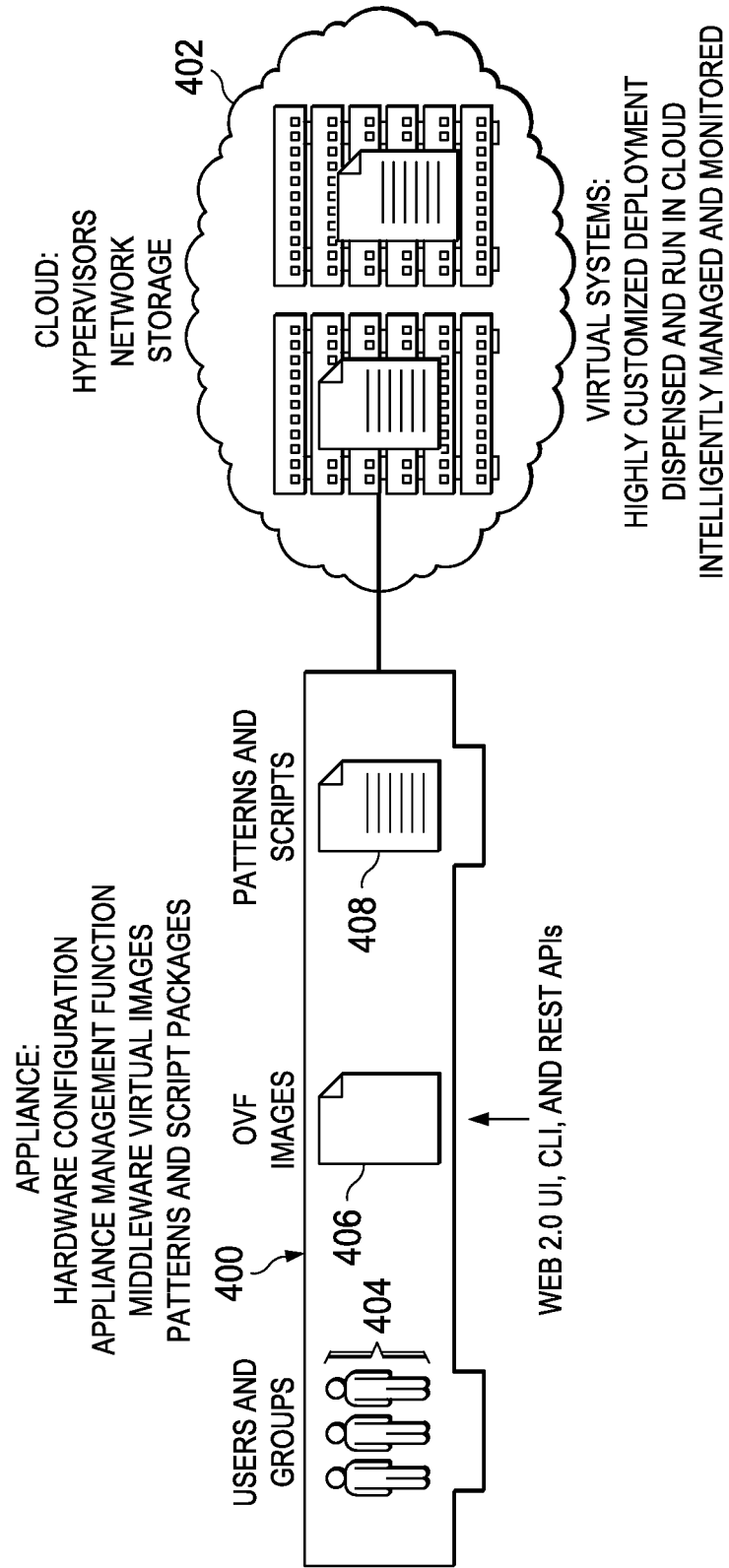
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
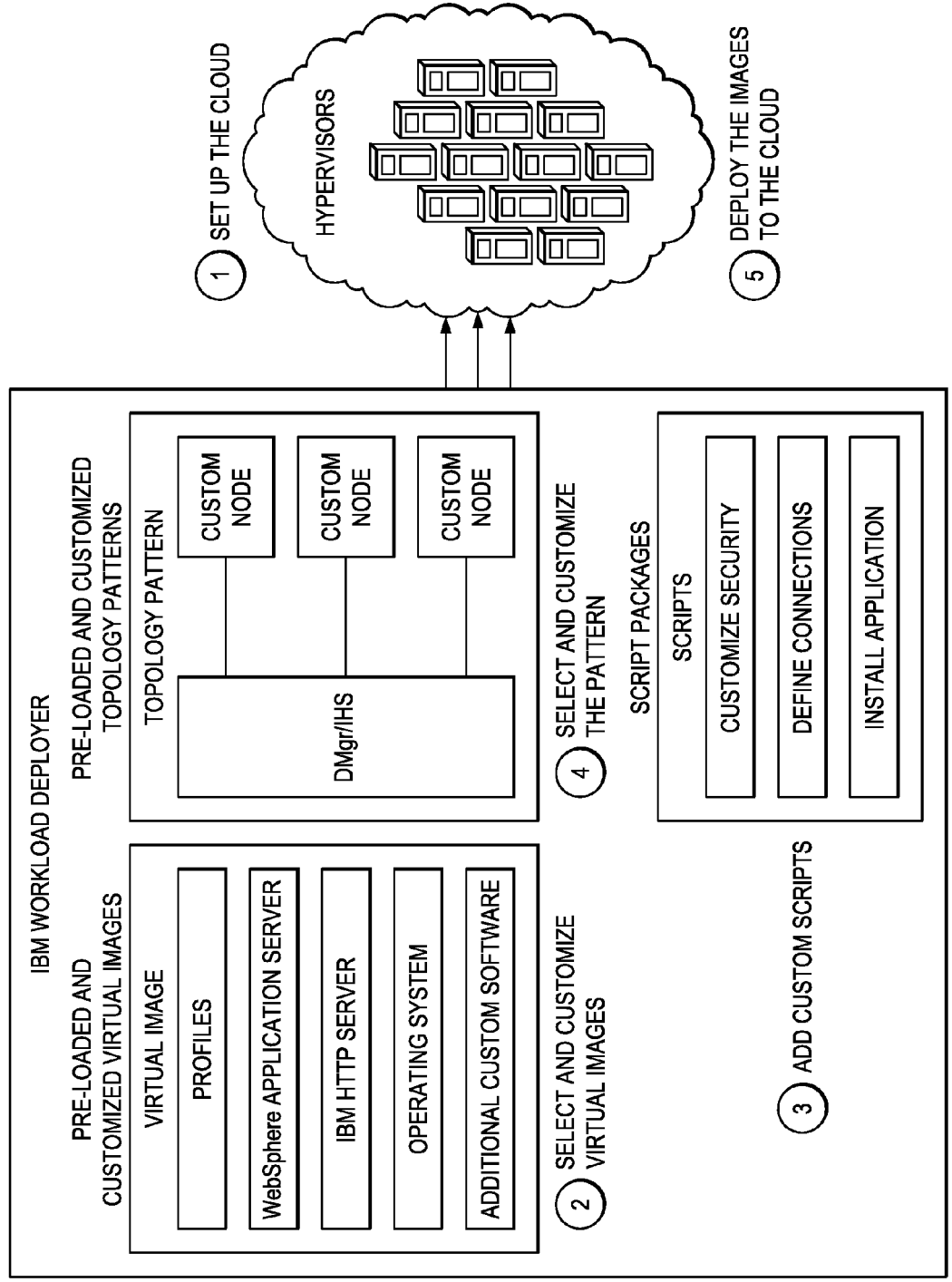
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described. Specific references to IWD should be construed to include both the above-identified product, as well as other technologies that implement the functionality referenced above.

By way of additional background, it is assumed that the cloud environment (and a deployment appliance such as described) operates in a trust framework, which comprises a number of aspects. In this framework, public key technology is used to secure communications. The framework leverages a suite of security services that provide user authentication, token service, and a certificate authority. Every server process operative within the trust framework has its own (e.g., RSA) token and an RSA key pair. Trademark rights are claimed by a third party in the designation RSA. The server's identity and roles are represented by a server RSA token, which is signed by the token service; every request is endorsed by a server RSA key. Preferably, each cloud deployment has its own agent RSA token and RSA key pair. The agent's identity and roles are represented by an agent RSA token, which is signed by a deployment administrator RSA key; every request is signed by an agent RSA key. In addition, the integrity and confidentiality of requests are protected by transport layer encryption, such as SSL. Every server (and every deployment) has an SSL certificate and private key issued by the certificate authority.

Establishing Trust Relationships

Figure 6:
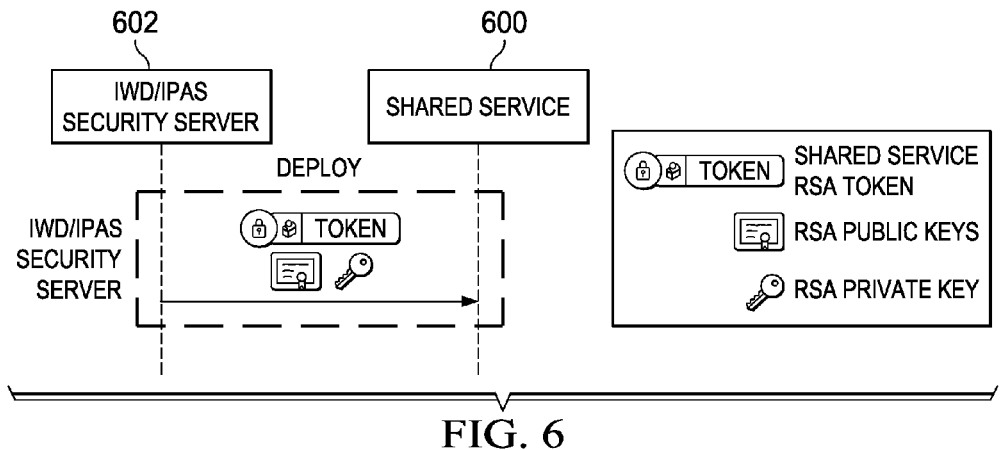
FIG. 6 illustrates a first embodiment illustrating how a shared service establishes a trust relationship using a security server.

In a cloud computing environment such as described, virtual machines (VMs) are regularly provided to handle different workload for different cloud customers. Because a VM is presumed to be provisioned in an unsecured environment, however, each VM should be in its own security zone. Each VM requires its own identity, token, keys and certificates, as well as a way to establish a trust relationship back to the cloud provider, preferably across different security domains. FIG. 6 illustrates how a VM in a separate security zone can register itself and establish a trust relationship. During this process, and as will be described, the VM leverages two (2) mechanisms to establish the trust relationships. First, it receives registration artifacts from the cloud service provider; these artifacts include information the VM needs to talk to the cloud service provider. Second, the VM sends its own security information to the cloud service provider, preferably without revealing a private security key.

In general, this approach uses a security server, which is a process in the cloud that manages all of the security information within the cloud environment. When a virtual machine (VM) is provisioned, e.g., using the above-described appliance (or otherwise), the cloud service provider sends registration artifacts to the virtual machine through the security server. The registration artifacts typically include the security server's public key, security headers generated with the security server's private key, and an identification of the necessary roles for the VM to communicate back to the security server. Once the VM receives the registration artifacts, it generates a registration request to the security server using the information in the registration artifacts. The registration request typically includes the VM's public key, and a public certificate. The security server receives the VM's public key and the public certificate, adds the key to a key database, and stores the certificate in a trust key store. Once the security server processed the registration request from the VM, the security server generates a token and sends it back to the VM, thus completing the registration process and the key exchange.

FIG. 6 illustrates how to establish a trust relationship between a shared service 600 and an IWD/IPAS security server 602. In this embodiment, a deployment VM is provisioned to have shared service (e.g., RSA-based) token and associated (e.g., RSA-based) key pairs. Shared service providers specify an SSO services provisioning flag to be granted a shared service RSA token. Shared services otherwise are shielded from implementation details of the provisioning process.

Figure 7:
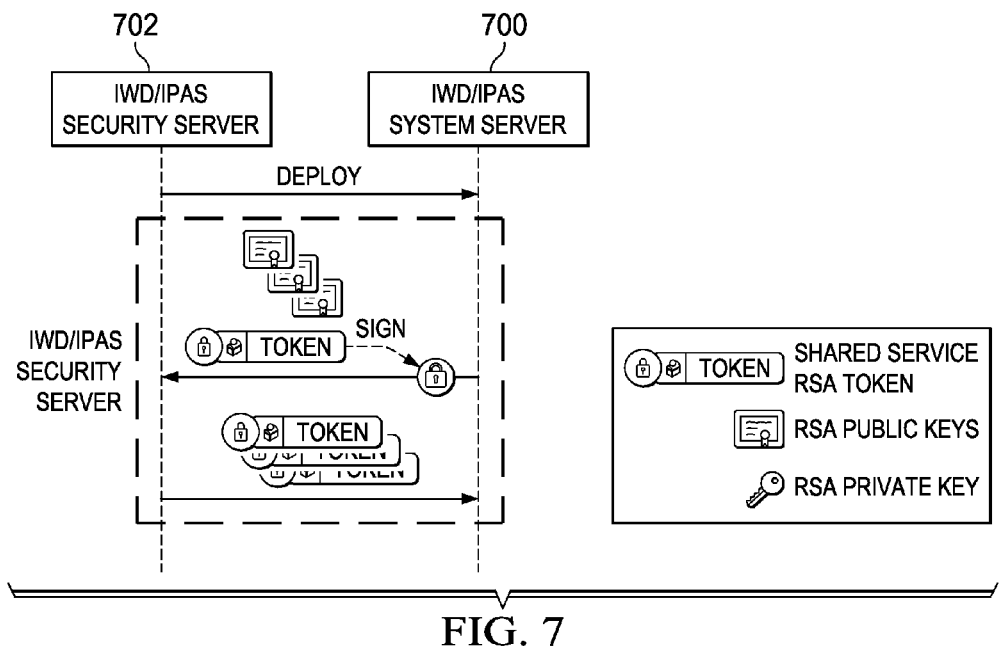
FIG. 7 illustrates a second embodiment illustrating how a system service establishes a trust relationship using a security server.

FIG. 7 is a more generalized example of setting up a trust relationship. In this embodiment, the IWD/IPAS system service 700 (in this example) establishes a trust relationship with the IWD/IPAS security server 702. In this example, the deployment VM is provided with registration artifacts, which include a one-time use security token and a registration identifier (ID). In this approach, the system service 700 registers a set of one or more RSA public keys and, upon registration, receives corresponding RSA tokens. In the FIG. 7 embodiment, the system service 700 retains its private key; thus, this approach is more secure that than shown in FIG. 6. In FIG. 7, neither entity has private keys of the other entity, so the two entities are on more equal terms with respect to the trust relationship. Also, the approach in FIG. 7 is more flexible in that it enables a shared service itself to determine how many tokens it needs. The approach in FIG. 7 further assumes that the two separate entities establish the trust relationship using a third channel by which a first entity gives a second entity (to which it desires the trust relationship) a minimum amount of secret data (e.g., a token) so as to construct the trust relationship.

Extending Infrastructure Security to Services

With the above as background, the subject matter of this disclosure is now described. Without limitation, the subject matter may be implemented within or in association with a cloud deployment appliance as has been described.

As used herein, a "shared service" is a service that is deployed by a cloud administrator and used by multiple virtual application deployments. Shared services may be of many different types, such as a caching service, a monitoring service, a proxy service (that provides routing and load balancing to multiple deployed web applications), and others.

A "shared services security model" according to this disclosure has several characteristic: a common security model for all IWD/IPAS shared services, and common security services for all IWD/IPAS shared services. Under the common security model, the IWD/IPAS security server manages user identity and access control policy, an IWD/IPAS security services utility library shields SSO token exchange details from shared services providers, and shared services providers extend IWD/IPAS access control to shared service resources. The common security services comprise user authentication services, user and group membership query, resource access control services, public key management, and trust relationship management. IWD/IPAS uses a security token (called RSAToken), to represent user identity and credentials, e.g., group membership and security roles. As will be described, IWD/IPAS also provides for user tokens, and these tokens are used to propagate user identity, credentials (group membership and security roles), and resource identifiers. In general, tokens (whether security tokens, or user tokens) are internal (system) constructs that are managed by a token service. A token exchange mechanism is used to facilitate shared services provisioning, as is now described.

This security model provides a seamless layer of security infrastructure to an application (with its own security infrastructure) running on a virtual machine in the cloud environment. A user (e.g., an administrator) registers to the layer of security infrastructure. Upon receiving a request by the user to add a service (e.g., a shared service) to the application (or to use that service, if previously deployed and enabled), the layer of security infrastructure is used to authenticate the user, preferably by communicating to the application using a private key. The application security infrastructure then adds (or enables access to) the service without requiring direct authentication from the user to the application security infrastructure.

Figure 8:
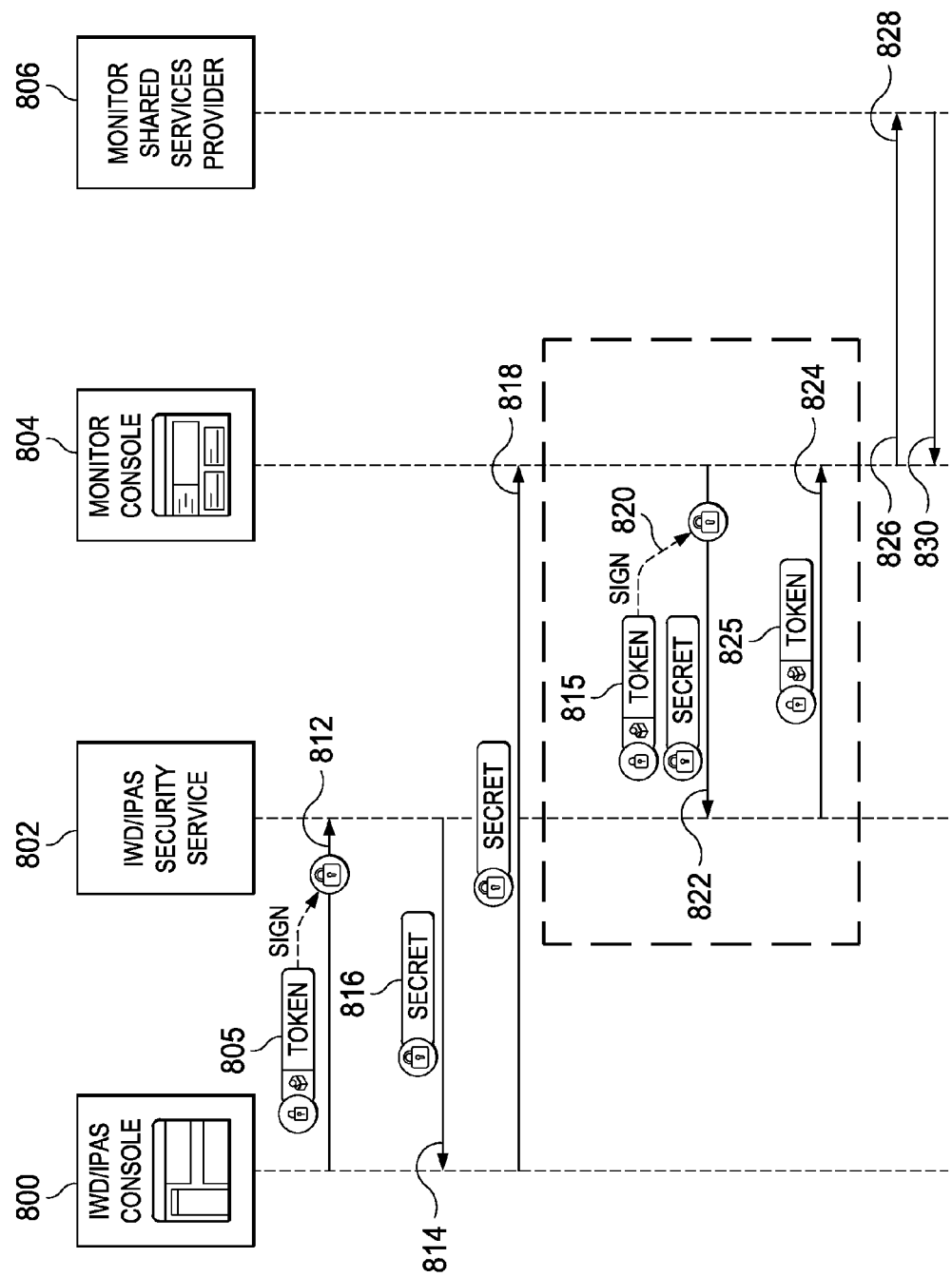
FIG. 8 illustrates a shared service single sign-on (SSO) model according to a first embodiment of this disclosure.

FIG. 8 illustrates the IWD/IPAS shared service single sign-on (SSO) model of this disclosure. This approach, as will be seen, facilitates integrating the shared service with a single sign-on to enable consistent and unified resource management across more than one service boundary. Familiarity with SSO operations is presumed. In this scenario, a representative "shared service" is a monitoring service (provided by a monitoring product), although this is not a limitation. The monitoring shared service may be accessed via its own monitor console; in this use case, however, access is desired via the deployment appliance console. In one use case scenario, which is merely exemplary, an administrator observes (in the IWS/IPAS console) a red status on a particular deployment, and clicks on the resource. This action leads the administrator to a monitoring console provided by the monitoring service. In this process, it is desired that the administrator is not required to register to the monitoring service software explicitly, does not need to authenticate to the monitoring software again, but can still view resources that he or she needs to monitor. The mechanism that is now described integrates such multiple services and provides SSO and consistent resource management across the service boundaries.

Thus, as illustrated, there interactions occur via IWD/IPAS console 800, IWD/IPAS security service 802, a monitor console 804, and a monitor shared services provider 806. The IWD/IPAS security service is implemented in the security server, which performs user identity management and access control policy management. This scenario assumes that the entities have established trust relationships in the manner previously described (in either FIG. 6 or FIG. 7).

Although not shown, it is assumed that the user of the IWD/IPAS console has been authenticated in a known manner. The user is represented within the system (the IWD/IPAS console 800 and the IWD/IPAS security service 802) by a first token 805. This token is not provided (or exposed) to the user but, rather, is just an internal system data structure. The token, which identifies what privileges the user has and resources he or she can access, typically is maintained in the system in the clear and affords the user all deployment privileges suitable to the user's status. In other words, the first token is a general user token, includes no specific deployment constraints (with respect to the user's privileges). The first token 805 includes the usual information such as data identifying its "issuer" (the IWD/IPAS security service) and its "owner" (the IWD/IPAS appliance/console), key pairs, and the like.

According to the technique described above, the authenticated user selects a link (e.g., a button, an icon, an alert, or the like) in the IWD/IPAS console page identifying or otherwise associated with a resource (in this case, a resource being monitored by the service). As noted above, in one use case, the resource is associated with a particular status (e.g., a problem status), although this is not a limitation. As will be seen, this selection in effect triggers a "transfer of control" from the IWD/IPAS console 800 to the monitor console 804 so that the user can access and use the monitor shared service to determine the source of the problem (or otherwise to take some remedial or other permitted action). Because this transfer of control is carried out over a public network, a token exchange service is implemented. This token exchange service is provided by suitable software code (e.g., an IWD/IPAS security services utility library) that, preferably, is transparent to the shared services provider 806 and seamlessly to the end user. The operation works as follows.

At step 812, the first user token 805 is signed and provided to the IWD/IPAS security service 802. The security service 802 receives the token 805, which is provided as cleartext, and, at step 814, returns to the IWD/IPAS console 800 a secret 816. The secret is protected by encryption and thus is opaque (and suitable for transport over the public network). At step 818, the console 808 sends the secret 816 to the monitor console 804. At step 820, the monitor console signs request messages with the secret with its private key that is specified by a second "shared services" token 815 and, at step 822, sends the signed messages and secret back to the IWD/IPAS security service 802. The "shared services" token 815 is owned by the shared services provider 806. The IWD/IPAS security service verifies the secret and, at step 824, sends the monitor console 804 a shared services user token 825. The shared services user token 825 differs from the first user token 805 in several important ways. Its "owner" is now the shared service, and it includes specific deployment constraints (whereas the general user token 805 did not). The shared services user token 825 includes the specific user identity and security roles that are authorized with respect to the shared service. The shared services user token 825 is used to access the monitor console automatically, after which the monitor console is displayed to the user. After the user selects (from the monitor console) some specific monitor operation, an access request is made from the monitor console 804 to the shared service 806. The access request is shown at step 826, and it includes the user identity and security roles that were propagated in the shared services user token. The shared service uses the user identity and security roles to facilitate its access control decision at step 828. If access is permitted, the requested information (e.g., monitoring data) is provided at step 830 to complete the process.

In the shared service SSO model in FIG. 8, the token exchange is transparent to the user, and steps 820, 822 and 824 are transparent to the shared services provider. As can be seen, and once the necessary trust relationships are established, the approach enables the shared service to participate seamlessly in the single sign-on (SSO) domain to facilitate unified access control.

Figure 9:
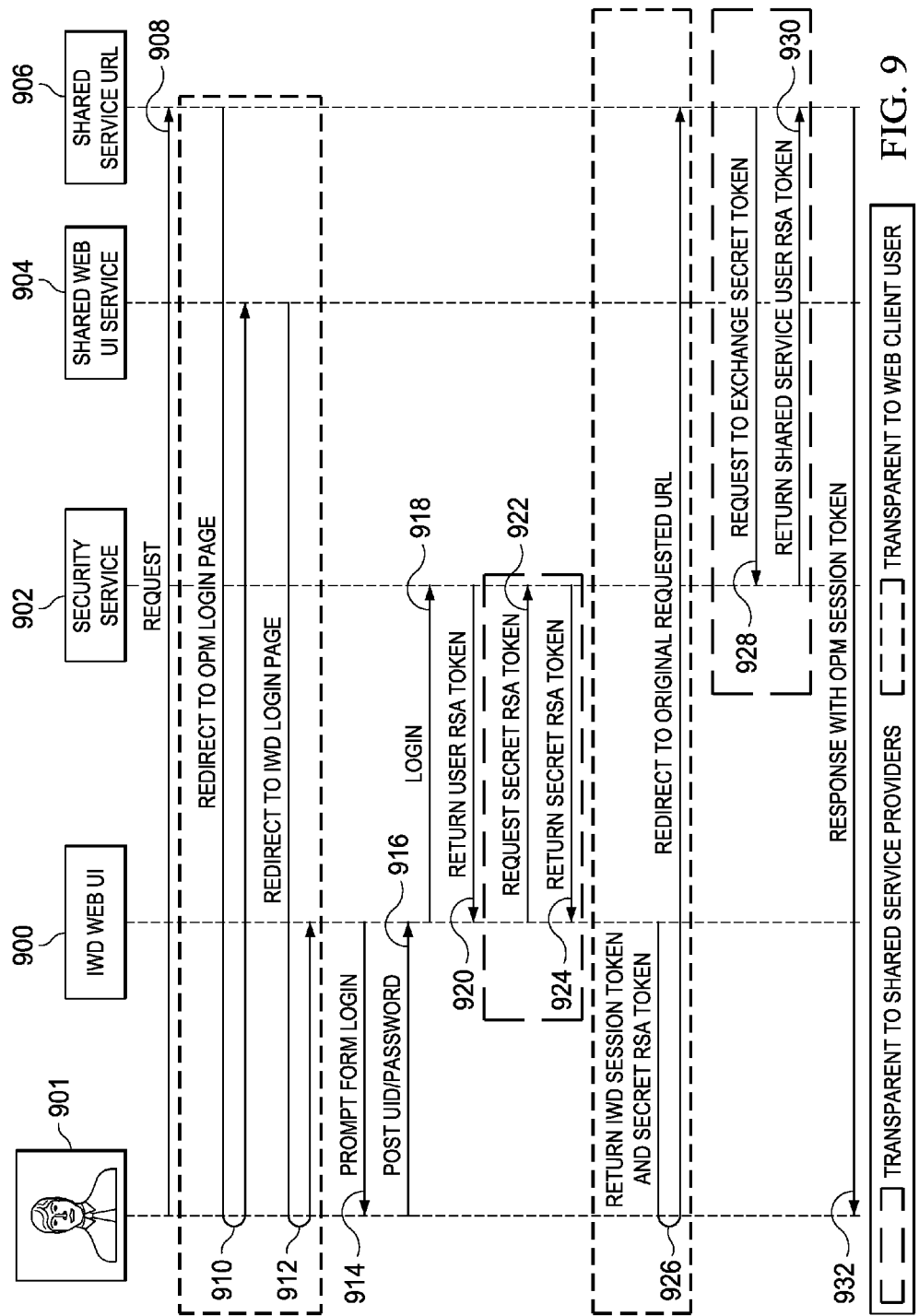
FIG. 9 illustrates how a web client accesses a monitoring shared service directly using a second embodiment of this disclosure.

FIG. 9 illustrates a second embodiment, wherein the shared service is launched from a URL (such as a bookmark or icon in the first service console). This embodiment uses entities of the same type described in FIG. 8, namely, a web-based user interface (UI) 900 from the deployer appliance (or other IPAS), the security service 902, the shared service web-based UI 904, and the shared service 906 (represented by the URL). Appropriate trust relationships are presumed, as previously described. In this embodiment, the user 901 makes a request to access the monitoring shared service by selecting a bookmarked URL in the console 900. This is step 908. This action causes a redirect to a login page of the shared service UI 904. This redirect is step 910. In this embodiment, and instead of issuing a challenge to the user, the shared service UI 904 (having established the necessary trust relationship), issues a redirect to the IWD console 900. This second redirect is step 912. Steps 910 and 912 are transparent to the user 901. At step 914, the IWD console 900 issues a login challenge to the user 901. The user posts his or her UID/password at step 916. If the user 901 is authenticated, the IWD console 900 logs into the security service 902 at step 918. The security service 902 responds at step 920 by returning the user token. At step 922, the IWD console 902 issues a request to the security service for a secret token (e.g., an RSA Token). The security service responds at step 924 by returning the secret token. At step 926, the IWD console 900 automatically redirects to the shared service page (the originally-requested URL), returning an IWD session token and the secret token it received from the security service at step 924. At step 926, the IWD 900 may optionally transform the resource identifier to one that is recognized by the shared service. At step 928, the shared service makes a request to the security service 902 to exchange the secret token. The security service 902 responds at step 930 by returning the shared service user token. The shared service then issues the user the requested information at step 932 to complete the process.

As seen in FIG. 9, the redirects at steps 910, 912 and 926 are transparent to the web client user. The steps 922 and 924, and steps 928 and 930, are transparent to the shared service provider. The token exchange in steps 928 and 930 in FIG. 9 corresponds to the token exchange in steps 822 and 824 in FIG. 8.

The techniques herein facilitate shared service deployment in the cloud. The first embodiment is as described in FIG. 8. In this approach, when an administrator or deployer clicks on a first icon representing a service to be deployed, the system sends a secret token that represents the administrator or deployer to the service. Using a security server, the service exchanges the secret token with a user security token that represents the credentials of the administrator or the deployer. The service then validates the user security token by extracting user identity, group, security role, and resource identifier information. Using the extracted information, the service then makes access control decisions. In this approach, the user identity management, authentication and access control are managed by the cloud computing infrastructure. A service being deployed just needs to exchange and validate the user security token, validate the trust relationship, and then enforce the access control policy. The administrator or deployer is not challenged for authentication to the service and can access specified resource services with his or her own user credentials.

In the FIG. 9 embodiment, and when the administrator or deployer clicks a second service icon (e.g., within a first service console), the service redirects to a management console for the cloud computing infrastructure. The redirect also specifies a resource and a second service to be accessed, as well as the secret token that represents the administrator or deployer. The cloud computing infrastructure forwards the secret token or optionally replaces it with a new secret token, and optionally transforms the resource identifier to one that is recognized by the second service. The console then redirects the request to the specified second service, which exchanges the secret token for a user security token to facilitate further access control, as described above. In this approach, the resource representation and optional conversion are performed by the cloud computing infrastructure software, so there is minimal processing required from the service.

The above-described subject matter provides many advantages. Generally, the techniques described herein enable the establishment of a trusted computing environment across security domains in a cloud computing environment. The described approach enables a cloud deployment appliance (or other IPAS) to easily integrate cloud computing infrastructure security and resource management with one or more additional services to provide seamless authentication and access control integration with minimal resource configuration synchronization and thus minimal management overhead. The approach reliably and securely extends cloud computing infrastructure security to one or more additional services, and it provides a mechanism to integrate multiple services and provide SSO and consistent resource management across service boundaries. Further, the techniques described herein enable application security infrastructure to add a new service without requiring direct authentication from the user to the application security infrastructure. Additional services may be integrated with a single sign-on (SSO). Using this approach, and has been described, consistent resource management is facilitated across more than one service boundary.

In this approach, the user identity management, authentication, and access control policy are managed by the cloud computing infrastructure, e.g., the IWD/IPAS. A service being shared just needs to exchange and validate the user security token, validate the trust relationship, and then enforce the access control policy. The IWD/IPAS administrator (or other deployer) does not need to be challenged for authentication to the service and can access specified resource services with just his or her IWD/IPAS user credentials.

While a preferred operating environment and use case (a cloud deployment appliance or other IPAS software) has been described, the techniques herein may be used in any other operating environment in which it is desired to deploy services.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As explained, the scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method of extending cloud computing infrastructure security to a service that is shared across virtual application deployments in the cloud computing infrastructure as a shared service, the method operative in a security service executing on a hardware element, comprising:
    establishing a trust relationship between the shared service and the security service;
    upon receipt of a request from a user to access the shared service, the request issued from an application other than the shared service, executing a token exchange among the application, the security service and the shared service to exchange a first token for a shared services token that is distinct from the first token, the first token representing the user within the security service and identifying privileges the user has and resources the user can access, the shared services token including credential information and one or more deployment constraints on authorized access to the shared service, the credential information including user identity and one or more security roles, the token exchange that exchanges the first token for the shared services token executed transparently to a provider of the shared service; and
    issuing to the shared service the shared services token, the credential information therein facilitating a transfer of control from the application to shared service interface to enable access to the shared service by the user without challenge.

2. The method as described in claim 1 wherein the token exchange comprises:
    upon receipt by the security service of the first token, issuing a secret that represents the user; and
    upon receipt by the security service of a second token from the shared service and verifying that the second token is associated with the secret, exchanging the second token for the shared services token that includes the credential information.

3. The method as described in claim 2 wherein the second token is exchanged for the shared services token that includes the credential information transparently to the shared service.

4. The method as described in claim 1 wherein the virtual application deployments operate in distinct security zones.

5. The method as described in claim 1 wherein the credential information in the shared services token also includes group membership.

6. The method as described in claim 1 wherein the first token includes no specific deployment constraints with respect to the user's privileges.

7. The method as described in claim 1 wherein the service is associated with a virtual machine, and wherein the trust relationship is established by:

providing the virtual machine one or more registration artifacts; and in response, receiving from the virtual machine security information without revealing a private security key associated with the shared service.

8. Apparatus, comprising:

a processor;

computer memory holding computer program instructions that when executed by the processor provide a security service, the computer program instructions further executed by the processor to provide a method to extend cloud computing infrastructure security to a service that is shared across virtual application deployments in the cloud computing infrastructure as a shared service, the method comprising:

establishing a trust relationship between the shared service and the security service;

upon receipt of a request from a user to access the shared service, the request issued from an application other than the shared service, executing a token exchange among the application, the security service and the shared service to exchange a first token for a shared services token that is distinct from the first token, the first token representing the user within the security service and identifying what privileges the user has and resources the user can access, the shared services token including credential information and one or more deployment constraints on authorized access to the shared service, the credential information including user identity and one or more security roles, the token exchange that exchanges the first token for the shared services token executed transparently to a provider of the shared service; and issuing to the shared service the shared services token, the credential information therein facilitating a transfer of control from the application to a shared service interface to enable access to the shared service by the user without challenge.

9. The apparatus as described in claim 8 wherein the token exchange comprises:

upon receipt by the security service of the first token, issuing a secret that represents the user; and upon receipt by the security service of a second token from the shared service and verifying that the second token is associated with the secret, exchanging the second token for the shared services token that includes the credential information.

10. The apparatus as described in claim 9 wherein the second token is exchanged for the shared services token that includes the credential information transparently to the shared service.

11. The apparatus as described in claim 8 wherein the virtual application deployments operate in distinct security zones.

12. The apparatus as described in claim 8 wherein the credential information in the shared services token also includes group membership.

13. The apparatus as described in claim 8 wherein the first token includes no specific deployment constraints with respect to the user's privileges.

14. The apparatus as described in claim 8 wherein the service is associated with a virtual machine, and wherein the trust relationship is established by:

providing the virtual machine one or more registration artifacts; and in response, receiving from the virtual machine security information without revealing a private security key associated with the shared service.

15. A computer program product in a non-transitory computer readable medium for use in a data processing system that provides a security service, the non-transitory computer readable medium comprising computer program instructions stored thereon which, when executed by the data processing system, provide a method to extend cloud computing infrastructure security to a service that is shared across virtual application deployments in the cloud computing infrastructure as a shared service, the method comprising:

establishing a trust relationship between the shared service and the security service;

upon receipt of a request from a user to access the shared service, the request issued from an application other than the shared service, executing a token exchange among the application, the security service and the shared service to exchange a first token for a shared services token that is distinct from the first token, the first token representing the user within the security service and identifying what privileges the user has and resources the user can access, the shared services token including credential information and one or more deployment constraints on authorized access to the shared service, the credential information including user identity and one or more security roles, the token exchange that exchanges the first token for the shared services token executed transparently to a provider of the shared service; and issuing to the shared service the shared services token, the credential information therein facilitating a transfer of control from the application to a shared service interface to enable access to the shared service by the user without challenge.

16. The computer program product as described in claim 15 wherein the token exchange comprises:

upon receipt by the security service of the first token, issuing a secret that represents the user; and upon receipt by the security service of a second token from the shared service and verifying that the second token is associated with the secret, exchanging the second token for the shared services token that includes the credential information.

17. The computer program product as described in claim 16 wherein the second token is exchanged for the shared services token that includes the credential information transparently to the shared service.

18. The computer program product as described in claim 15 wherein the virtual application deployments operate in distinct security zones.

19. The computer program product as described in claim 15 wherein the credential information in the shared services token also includes group membership.

20. The computer program product as described in claim 15 wherein the first token includes no specific deployment constraints with respect to the user's privileges.

21. The computer program product as described in claim 15 wherein the service is associated with a virtual machine, and wherein the trust relationship is established by:

providing the virtual machine one or more registration artifacts; and in response, receiving from the virtual machine security information without revealing a private security key associated with the shared service.

* * * * *